Jan. 29, 1963  R. BLUMBERG ET AL  3,075,569
LENGTH MEASURING AND MARKING APPARATUS
Filed May 25, 1959  4 Sheets-Sheet 1

INVENTORS
RICHARD BLUMBERG
GEORGE MOORE
BY
Caesar and Rivise
ATTORNEYS

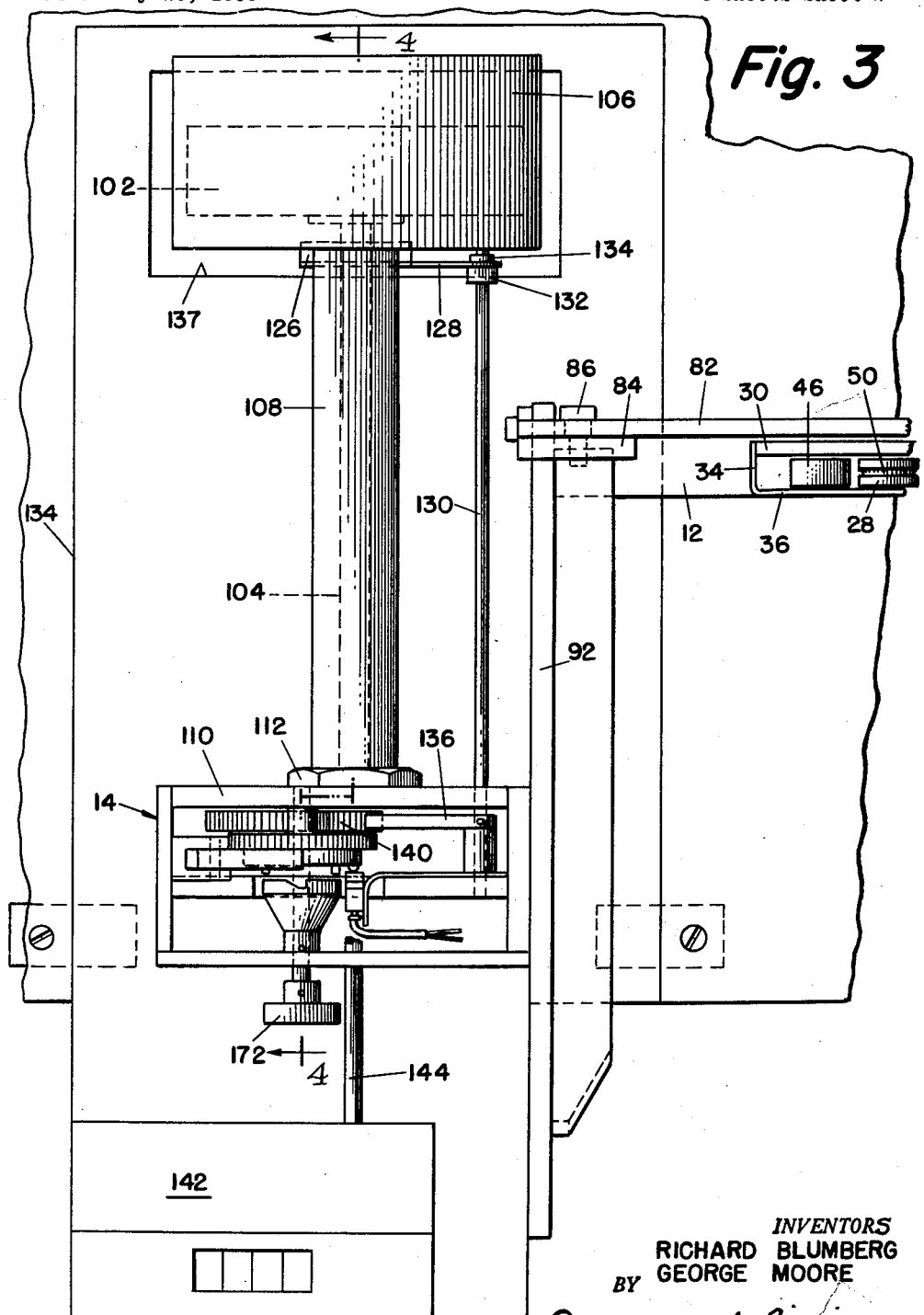

Jan. 29, 1963  R. BLUMBERG ET AL  3,075,569
LENGTH MEASURING AND MARKING APPARATUS
Filed May 25, 1959  4 Sheets-Sheet 3
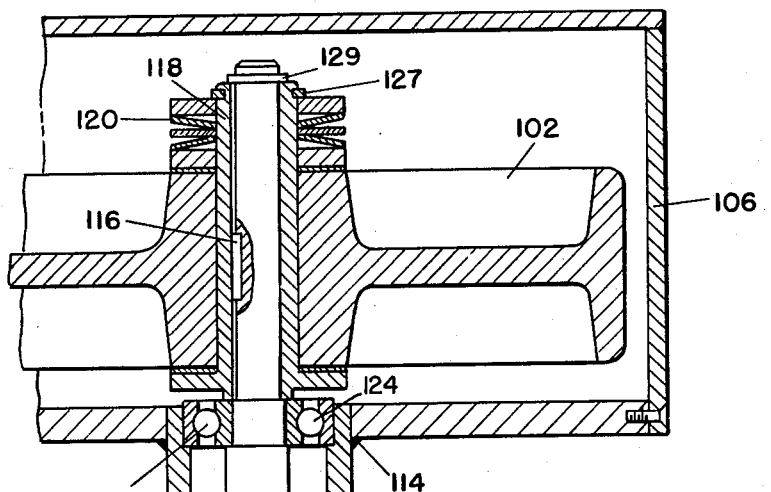
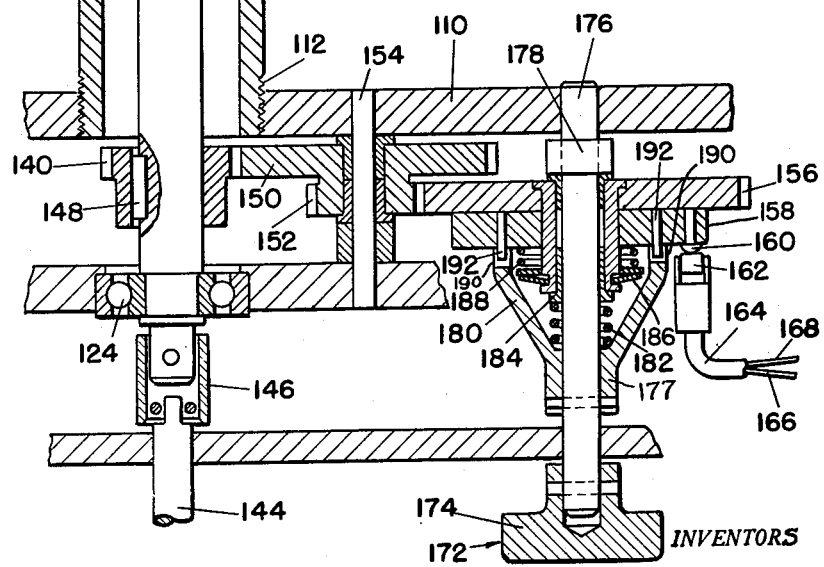
Fig. 4
INVENTORS
RICHARD BLUMBERG
BY GEORGE MOORE
Caesar and Rivise
ATTORNEYS

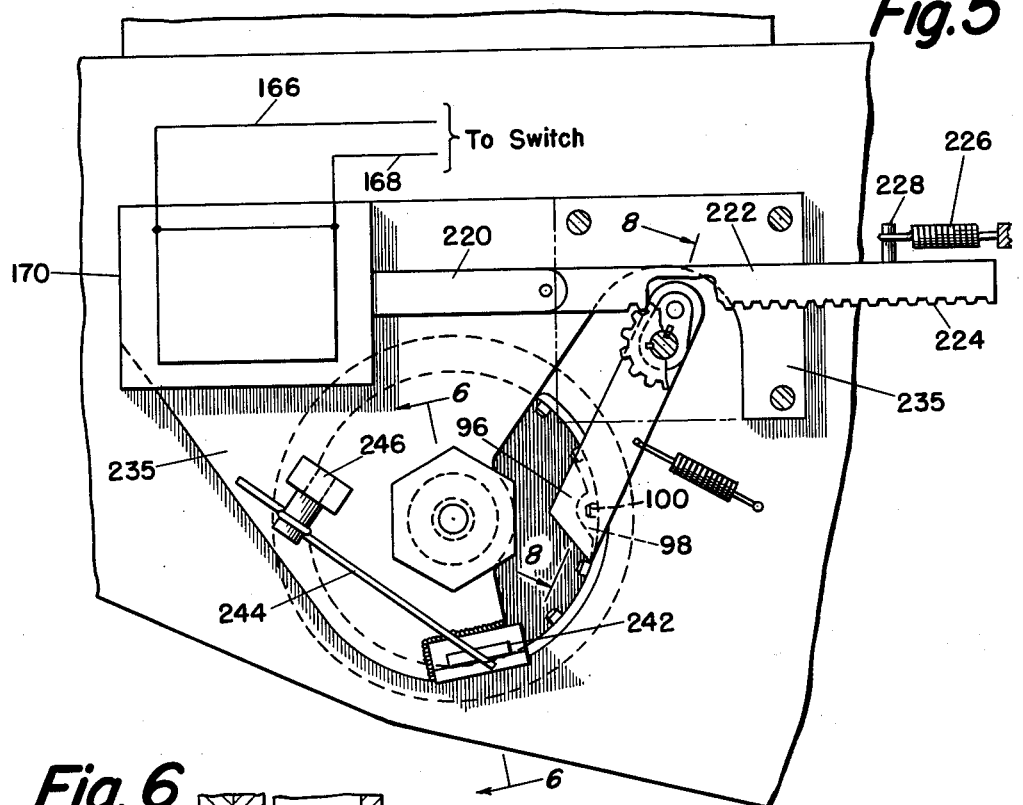
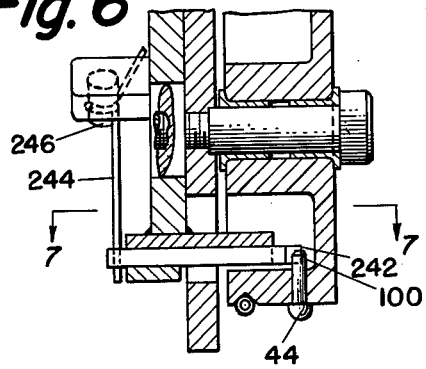
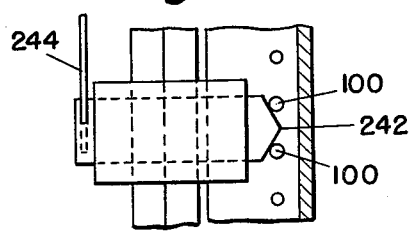
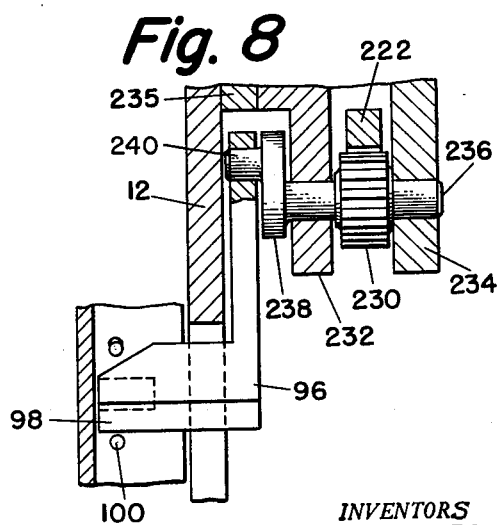

United States Patent Office 3,075,569
Patented Jan. 29, 1963

3,075,569
LENGTH MEASURING AND MARKING
APPARATUS
Richard Blumberg, 2123 Pershing Ave., Morton, Pa., and
George Moore, 215 Holmes Road, Holmes, Pa.
Filed May 25, 1959, Ser. No. 815,646
7 Claims. (Cl. 156—378)

This invention relates to an apparatus which will measure a sheet or web of material and apply thereto a marked, gummed label at predetermined intervals.

When manufacturing or otherwise dealing with long sheets or webs of material in roll form, it is essential to know the linear content thereof. Thus, a multitude of measuring devices have come into being and are widely used.

It has been found, however, that a mere knowledge of the overall linear content of a roll of goods may not be fully adequate to meet the demands of many industries. Should even a few yards of goods be removed from a roll, the initial measurement of the linear content thereof would be rendered meaningless and more likely to lead to errors than no measurement at all. In this situation, it is the practice to require an employee to revise the figure representing total linear content in order to account for any material removed. However, such a system may not work in actual practice either because of carelessness on the part of the employee or the pressure of time. Should the employee forget to revise the figure representing total linear content then a new measurement would be required if and when the error is detected.

The above problem is frequently encountered in the garment industry where it is the usual practice, because of the great variety of fabrics and fabric designs, to employ only a portion of a roll of goods at a given time. Moreover, in that industry, economical layout and cutting of fabrics are materially dependent upon a knowledge of the linear content of a roll of goods.

It is therefore an object of the present invention to provide a device which will measure and mark a roll of goods at predetermined intervals so that the exact linear content thereof may be determined at all times by merely locating one of said marks which is closest to the unwound end of said goods.

It is a further object of the present invention to provide a measuring device of the character described which not only effects a saving of time and labor but which is itself relatively simple in design, construction and operation so that the possibility of malfunction of the measuring and marking means is reduced to a minimum.

Still another object of the present invention is to provide a device which will accurately position an appropriately marked label at a plurality of predetermined intervals along the length of a roll of goods.

A further object of the present invention is to provide a measuring device of the character described which includes means to eject unwanted labels, means to reset the device to commence operation at the beginning of a predetermined interval and means to immediately stop operation when cloth is no longer passing through said device.

Other objects and many of the attendant advantages of this invention will be readily appreciated as the same becomes better understood by reference to the following detailed description when considered in connection with the accompanying drawings wherein:

FIG. 1 is a side elevation of an embodiment of the present invention with portions of the housing cut away;

FIG. 2 is a top plan view of a strip of labels and associated backing to be used in conjunction with the device of FIG. 1;

FIG. 3 is a fragmentary top plan view of the device of FIG. 1;

FIGURE 4 is an enlarged fragmentary vertical sectional view taken along the lines 4—4 of FIGURE 3 showing in detail the goods sensing wheel, the associated gearing and the reset device, with certain portions broken away or shown in section for clarity;

FIG. 5 is a partial side elevational view of the device of FIG. 1 with portions of the housing cut away but taken from a side opposite to that of FIG. 1;

FIG. 6 is a sectional view taken along the lines 6—6 of FIG. 5;

FIG. 7 is a sectional view taken along the lines 7—7 of FIG. 6;

FIG. 8 is a sectional view taken along the lines 8—8 of FIG. 5.

Specific reference is now made to the drawings wherein like reference characters are used for like elements throughout.

The device is generally indicated at 10 in FIG. 1 and includes support member 12, table 13 and housing and support member 14. Appropriately marked gummed labels 16 as shown in FIG. 2 are wound into a roll 18 which is operatively positioned on device 10. Labels 16 are individually mounted on a releasable backing 22 having apertures 20 therein positioned between said labels. The inner surface of labels 16 is provided with a tacky heat sensitive coating (not shown) which is protected by said releasable backing 22.

Roll 18 is supported by rollers 24, 26 and 28, the former two of which are rotatively secured to support 12. With this type of support a spindle for roll 18 is eliminated. Roll 18 is also partially enclosed by a housing secured to support 12 which includes rear housing 30, side housing 32 and 34 and front housing flaps 36 and 38 which also enclose rollers 24 and 26. A strip 40 of labels 16 on releasable backing 22 is led from roll 18 and travels under and against rolls 26 and 28 to the outer circumference of feeding wheel 42. The center of the outer circumference of the wheel 42 is provided with hubs 44 which project above the surface of said circumference and through apertures 20 of releasable backing 22. Strip 40 is guided around a portion of the circumference of wheel 42 and then around a portion of roller 46 just prior to the sequential ejectment of a label 16 upon the goods being measured and marked. A third roller 48 mounted on support 12 is provided for the guidance of backing 22 after its separation from labels 16 of strip 40.

Wheel 42 is mounted on shaft 43 projecting through support 12 as will be fully discussed infra. Each of the rollers 28, 46 and 48 is mounted for cooperation with wheel 42 in moving strip 40 into position for ejectment of labels 16. Roller 28 which bears directly against a hub 44 of wheel 42 possesses a circumferential groove 50 (FIG. 3) to accommodate the movement of said hubs 44. Rollers 46 and 48 need not possess a circumferential groove as they bear against the circumferential surface of wheel 42 rather than against hubs 44 as is the case with roller 28.

Pivoted to support 12 as at 52, 54 and 56 are arms 58, 60 and 62 to which are attached rollers 28, 46 and 48 respectively. Each of said rollers is biased against wheel 42 by means of coil springs 64 and 66. One end of coil spring 64 is secured to arm 58 of roller 28 and the other end thereof is secured to arm 60 of roller 46. In this manner said rollers are urged towards each other and consequently against the circumference of wheel 42. Spring 66 with its lower end anchored in support 12 and its upper end secured to arm 62 of roller 48 urges roller 48 downwardly and consequently against the circumference of wheel 42. In this manner the rotation of wheel 42 (with hubs 44 projecting through apertures 20 of strip 40) is best transferred to strip 40 thereby moving said strip into position for sequential ejectment.

Continued rotation of wheel 42 urges strip 40 over guide means 68 which is secured to support 12 by means of bolts 70, 72 and 74. Heating means 76 above guide means 68 is provided to activate the adhesive layer on labels 16 should such be needed. Continued forward motion of strip 40 finally urges successive labels 16 over guide means 68 and onto the surface of the material being measured and marked, the reversal of direction and bending around the sharp corner of guide means 68 and adhesion of a portion of the tacky undersurface of a label 16 to the goods causing the separation of a given label 16 from strip 40. Roller 69 with connecting arm 71 pivoted to support 12 at 73 momentarily bears against a newly ejected label to insure complete adhesion to the goods being measured and marked.

Backing 22 travels under guide member 68, then around the under portion of wheel 42, around roller 48 and then to roll 76 where it is collected for disposal. Roll 76 is mounted on shaft 78 which is driven by a continuous coil spring 80. Coil spring 80 extends about a portion of hub 81 which is drivingly connected to shaft 78 and within a curved slot located below the hubbed circumferential surface of wheel 42. In this manner rotation of wheel 42 is transferred to hub 81, to shaft 78 and thence to take-up roll 76 thereby effecting a positive winding of backing 22. By its nature coil spring 80 is a driving belt which will slip when a certain degree of friction is developed as against the surface of hub 81. Thus, backing 22 will not be wound too tightly on roll 76.

The entire housing 12 with its associated components is pivotally secured to a rear wall 82 by means of a hub 84 secured to wall 82 with bolt 86 as shown in FIGS. 1 and 3. A fine adjustment bolt 88 with associated nut 90 projects through wall 92 of housing 14 and bears against wall 94 of support 12. In this manner guide means 68 may be precisely positioned in relation to the goods being measured and marked by merely adjusting bolt 88 to raise or lower support 12. Such adjustment is important as thicker or thinner goods are moved past the apparatus.

Wheel 42 is intermittently rotated by means of the stroke of arm 96 with a scoop 98 (FIG. 5 and FIG. 8) which urges the internal nub 100 of hub 44 downwardly for a predetermined distance. When returning to its original position on the return stroke, arm 96, because of the shape of scoop 98, bears against a new nub 100 at an acute angle. In this manner, wheel 42 is successively rotated thereby successively applying labels 16 to the goods being measured and marked.

The remainder of the present device is essentially devoted to the means for controlling and actuating arm 96 at precise times to coincide with the predetermined distances between labels 16 which are finally applied to the goods.

A sensing wheel 102 (FIGS. 3 and 4) mounted on shaft 104 is provided. Wheel 102 is mounted within housing 106 and shaft 104 is mounted within housing 108. One end of housing 108 is secured to gear housing 110 via threading at 112 whereas the other end of housing 108 is secured to housing 106 at 114. Shaft 104 is keyed at 116 to a bushing 118 which is frictionally and releasably secured to wheel 102 by means of a spring clutch 120. Thus when shaft 104 is restrained from rotation (as will be explained infra) wheel 102 will slip as against bushing 118 because of the action of spring clutch 120. Shaft 104 is journaled in the movable races of bearings 122 and 124 and is further secured to bushing 118 via washer 127 and flange 129.

A stop means is provided for actuation when the measurement and marking of a roll of goods has been completed. A feeler member 126 is provided (FIG. 1 and FIG. 3) adjacent to sensing wheel housing 106, said feeler member 126 having an arm 128 which is pivotally attached to a rod 130 by fasteners 132 and 134. A rectangular recess or hole 137 in table 13 is normally covered by goods passing thereover and under wheel 102 thereby preventing feeler member 126 from falling into hole 137. As soon as goods no longer pass under wheel 102, feeler member 126 drops into hole 137 thereby rotating shaft 130 in an arc of approximately twenty degrees. Grasping claw 136 with gear engaging teeth 138 is secured at the opposite end of shaft 130. Thus claw 136 is rotated for twenty degrees and engages gear 140 which is secured to shaft 104 thereby restraining shaft 104 from rotation and halting the rotation of wheel 102. The immediate stopping action is important for precise measurement when as in FIG. 4 the rotation of wheel 102 is translated through shaft 104 to a counter 142 by means of a counter shaft 144 coupled to shaft 104 with coupling 146.

The rotation of shaft 104 (by rotation of sensing wheel 102) is translated to arm 96 and nub 100 of hub 44 by means of a gearing system contained within housing 14 which actuates a solenoid which actuates arm 96. Gear 140 is directly coupled to shaft 104 at 148 and so is rotated by said shaft 104. Gear 140 meshes with gear 150 which has a gear 152 coupled thereto through a common shaft 154 extending through wall 110. Gear 152 meshes with gear 156 which has a plate 158 coupled thereto. Mounted on plate 158 is a nub 160 which revolves with said plate 158. When nub 160 contacts a lever of microswitch 162, said microswitch 162 closes a circuit 164 with leads 166 and 168 which travel to solenoid 170 thereby initiating the stroke of arm 96 against nub 100. Gears 140, 150, 152 and 156 are so interrelated that nub 160 will make a single revolution which corresponds to the passage of a predetermined length of goods under wheel 102. Thus, the cranking of arm 96 is actuated by the passage of a predetermined length of goods under wheel 102.

It is essential that nub 160 be so positioned in relation to microswitch 162 that the first label 16 ejected be affixed to the goods at a distance from the leading end of the goods equal to the predetermined distance between subsequently affixed labels (as determined by the rotation of nub 160). In other words nub 160 must be "zeroed in." This is accomplished by zero reset device 172 (FIG. 4). Reset device 172 comprises a handle 174 and a central stem or shaft 176 which extends through gear 156 and wall 110 and is held therebetween by means of flange 178. Attached to stem 176 are a plurality of grabbing members 180 whose bases are flexibly biased by a spring 182 against a bushing 184 disposed about shaft 176. Spokes 186 extend from a collar 177 and are telescoped over shaft 176 and project over a spring clutch device 188 (similar to 120) which is slipped over said bushing 184. Thus, if handle 174 is inadvertently depressed while the device is in operation, members 180 will rotate with plate 158 because of the slipping action of clutch 188. Claws 190 are attached to grabbing members 180, the claws 190 being adapted to engage fingers 192 projecting from plate 158. Thus, handle 174 may be depressed sufficiently so that claws 190 engage fingers 192 of plate 158. Handle 174 is then rotated by rotating plate 158 until nub 160 contacts microswitch 162 thereby actuating solenoid 170 which in turn causes a label 16 to be ejected. The apparatus is now adjusted to zero, handle 174 is returned manually under the urging of spring 182 to its initial position and goods may be fed under wheel 102. The first label 16 will be affixed to the goods at a distance from the leading end of the goods equal to the predetermined distance between subsequently affixed labels.

Rollers 194 and 196 with an enveloping rubber belt 199 (FIG. 1) may be positioned beneath feeler wheel 102 to enhance the contact between the goods being measured and marked and wheel 102, the goods flowing between said wheel and said rollers. This flow of goods is caused by conventional feeding means not shown in the drawing.

Roller 194 is rotatively attached at 198 to arm 200 which is pivotally attached at 202 to base 204. Roller 196 is rotatively attached at 206 to an arm 208 which is secured at 210 to a plate which is fastened to base 204.

Plate 158 has a tooth 214 therein which is adapted to receive a pawl 216 which is pivotally secured to housing 14 at 218. Thus, plate 158 can be rotated only in a clockwise direction as best shown in FIG. 1.

When nub 160 contacts microswitch 162 a circuit is momentarily made (until the rotation of plate 158 carries nub 160 past microswitch 162). Solenoid 170 (FIG. 5) is activated to cause arm or plunger 220 to move to the left as viewed in FIG. 5. Secured to arm 220 is rack 222 with a serrated lower edge 224. Rack 222 has a spring 226 secured thereto at 228 which urges rack 222 to the right when solenoid 170 is not activated. Serrated edge 224 of rack 222 meshes with pinion 230 (FIG. 8) which is positioned between bearing extensions 232 and 234 of a bearing block. A further plate 235 is positioned between support 12 and block 232. Pinion 230 is secured to a shaft 236 passing therethrough. One end of shaft 236 is rotatively secured in bearing block 234 whereas secured to the other end thereof is a crank 238 to which is pinned at 240 arm 96 with scoop 98.

A locating member 242 is provided which slips between nubs 100. Member 242 is resiliently biased against and between said nubs by a spring 244 which is tensioned around grooved member 246. Thus, when wheel 42 is advanced by arm 96, member 242 is urged outwardly (FIG. 7) by the movement of nubs 100. However, member 242 then slips between the next pair of nubs 100 thereby effecting a constant and controlled movement of wheel 42.

A by-pass switch 248 is provided on housing 14. This switch makes a circuit which by-passes circuit 164 and instead is directly connected to solenoid 170. Thus, a given number of labels 16 may be ejected by merely pressing switch 248 several times. In this manner the labels may be successively ejected until a label with the desired numeral printed thereon is in position to be ejected onto the goods to be measured and marked. An off-on switch 250 with a bulb indicator (not shown) is provided on housing 14.

The operation of device 10 is as follows:

The material to be measured and marked is threaded between sensing wheel 102 and lower rollers 194 and 196. Guide means 68 is precisely positioned in relation to said goods by adjustment of bolt 88. A strip 40 having labels 16 is led from roll 18 under and against rolls 26 and 28, is then threaded upon wheel 42 (about hubs 44), is then led about a portion of roller 46 and around guide means 68. At this point the labels 16 should be removed from backing 22 and said backing 22 led around the under portion of wheel 42 (about hubs 44), around roller 48 and then to roll 76 where it is collected for disposal. Switch 250 is turned on to provide a supply of current to the circuits of the device when such are completed. Heating means 76 is then turned on. By-pass switch 248 is depressed several times to successively actuate solenoid 170 thereby causing an ejectment of labels until a label with the desired numeral printed thereon is second in position to be ejected onto said material. In one embodiment a label was to be ejected every three yards. Hence the label carrying the numeral "3" thereon is in second position to be ejected with a label marked "6" in third position to follow three yards later. Reset handle 174 is then depressed and turned until nub 160 contacts microswitch 162 thereby actuating solenoid 170 which causes the label in first position to be ejected and the label marked "3" is thereby advanced to first position and the device is precisely calibrated.

The material is then advanced by feeding means under sensing wheel 102 thereby causing shaft 104 to rotate which in turn causes the rotation of plate 158 through interposed gears 140, 150, 152 and 156. When nub 160 makes a full revolution it momentarily contacts a lever of microswitch 162 thereby closing circuit 164. Solenoid 170 is activated thereby actuating arm 220 with associated rack 222, pinion 230, crank 238 and finally causes arm 96 to make a stroke against a nub 100. In this manner wheel 42 is rotated a predetermined distance as controlled by locating member 242. Thus, the label 16 marked with a "3" is moved onto the goods at a precise time. Because of the tacky undersurface of said label 16, any slight contact with the material causes the label 16 to be carried along therewith and under roller 69 to insure complete adhesion. By virtue of the aforesaid action, the label marked "6" has been advanced to first position. When nub 160 again makes a full revolution (3 yards later) microswitch 162 is contacted thereby activating solenoid 170 and the cycle is repeated.

When the end of the material has been reached, feeler member 126 drops into hole 137 thereby causing claw member 136 to engage gear 140 to restrain shaft 104 from rotation and thereby tend to halt the rotation of sensing wheel 102. This immediate stopping action is necessary whenever shaft 104 is coupled to shaft 144 of counter 142, for otherwise the continued rotation of shaft 104 after the end of the material has been reached will make counter 142 give a high reading. The sudden stopping force applied to wheel 102 and the consequential twisting action on shaft 104 is inhibited by the action of spring clutch 120 which permits wheel 102 to slip freely on bushing 118 thereby expending its torque.

Should reset device handle 174 be inadvertently depressed while shaft 104 is turning gears 140, 150, 152 and 156, members 180 thereof will rotate with plate 158 because of the slipping action of clutch 188. In this manner said gears will be protected from the otherwise harmful grabbing action of members 180.

Obviously, many modifications and variations of the present invention are possible in light of the above teachings.

It is, therefore, to be understood that within the scope of the appended claims the invention may be practiced otherwise than as specifically described.

What is claimed as the invention is:

1. Apparatus for measuring and labelling linear yard goods at predetermined intervals comprising a feeding wheel of annular shape having inner and outer diameters, a plurality of guiding pins projecting from said outer diameter and a plurality of actuating pins projecting from said inner diameter, means for feeding a measuring strip to said feeding wheel, said strip having spaced apertures adapted to cooperate with and be motivated by the rotation of said feeding wheel, measuring means adapted to motivate said actuating pins for intermittently rotating said feeding wheel, said measuring means including a sensing wheel rotatable by said linear goods adapted to intermittently motivate said actuating pins whereby a portion of said strip is intermittently advanced onto said goods at predetermined intervals.

2. The apparatus of claim 1 wherein said strip is initially wound in a spindleless roll supported on roller means.

3. The apparatus of claim 1 wherein said strip comprises detachable labels and includes a removable backing adapted to be separated from said detachable labels when said detachable labels are intermittently advanced onto said goods, said backing thereafter being guided by guide means over certain of said guiding pins and then being wound by roll means revolvably secured to and actuated by said feeding wheel.

4. The apparatus of claim 1 wherein a resiliently biased locating member bears against and is seated between certain of said guiding pins whereby said locating member may be urged from its seated position by the intermittent rotation of said feeding wheel and will return to its seated position between at least one different guiding pin when said feeding wheel no longer moves.

5. The apparatus of claim 1 including a system of gears adapted to be activated by movement of said sensing wheel and adapted to activate said feeding wheel.

6. The apparatus of claim 5 including solenoid means motivated by said system of gears, said solenoid means motivating crank means adapted to activate said feeding wheel.

7. The apparatus of claim 1 wherein said sensing wheel is mounted on a shaft secured in a flange, said wheel being adapted to rotate said shaft, spring clutch means interposed between said sensing wheel and said flange and a feeler member adapted to instantaneously stop the rotation of said shaft whereby said sensing wheel will slip relative to the halted shaft permitting the sensing wheel to rotate with respect to the shaft.

References Cited in the file of this patent

UNITED STATES PATENTS

| | | |
|---|---|---|
| 327,540 | Eisenhart | Oct. 6, 1885 |
| 731,702 | Monforts | June 23, 1903 |
| 1,949,158 | Gay | Feb. 27, 1934 |

FOREIGN PATENTS

| | | |
|---|---|---|
| 571,780 | Canada | Mar. 3, 1919 |